United States Patent [19]

Snow et al.

[11] Patent Number: 5,169,887

[45] Date of Patent: Dec. 8, 1992

[54] METHOD FOR ENHANCING THE FLAME RETARDANCE OF POLYPHENYLENE ETHERS

[75] Inventors: Kevin M. Snow, Clifton Park; Gary C. Davis; Gim F. Lee, both of Albany, all of N.Y.

[73] Assignee: General Electric Company, Schenectady, N.Y.

[21] Appl. No.: 820,822

[22] Filed: Jan. 15, 1992

Related U.S. Application Data

[63] Continuation of Ser. No. 659,819, Feb. 25, 1991, abandoned.

[51] Int. Cl.⁵ .......................... C08J 5/10; C08K 5/54; C08L 71/12
[52] U.S. Cl. .................................... 524/267; 524/265; 524/266
[58] Field of Search ......................... 524/267, 265, 266

[56] References Cited

U.S. PATENT DOCUMENTS 3,737,479  6/1973  Haaf ................................ 260/824 R
4,446,090  5/1984  Lovgren et al. ..................... 524/264
4,487,858  12/1984 Lovgren et al. ..................... 523/348

OTHER PUBLICATIONS

Article—The Interscience Encyclopedia, Inc.—Encyclopedia of Chemical Technology, vol. 12, pp. 396, 402–403, Silicones.
Article—Kirk-Othmer, Encyclopedia of Chemical Technology, vol. 18, pp. 237–241, Silicon Compounds (Silicones).
Article—Wiley-Interscience Publication—Encyclopedia of Polymer Science and Engineering, vol. 15, pp. 258–264, Silicones.

*Primary Examiner*—Paul R. Michl
*Assistant Examiner*—U. K. Rajguru
*Attorney, Agent, or Firm*—William A. Teoli; William H. Pittman

[57] ABSTRACT

Improved flame retardance and smoke/heat reduction has been imparted to polyphenylene ethers by blending the polyphenylene ethers with organopolysiloxane fluids having a critical mole % range of chemically combined phenylsiloxane units.

4 Claims, No Drawings

METHOD FOR ENHANCING THE FLAME RETARDANCE OF POLYPHENYLENE ETHERS

This application is a continuation of application Ser. No. 07/659,819, filed Feb. 25, 1991, now abandoned.

BACKGROUND OF THE INVENTION

The present invention relates to a method of improving the thermal properties of polyphenylene ether, by blending the polyphenylene ether with a siloxane fluid having a critical mole % of chemically combined phenylsiloxane units. More particularly, the polyphenylene etherphenylsiloxane fluid blends provided by the method of the present invention, have been found to possess a reduction in both peak smoke release rate and total smoke when tested in accordance with ASTM E906-83.

Prior to the present invention, as shown by Haaf, U.S. Pat. No. 3,737,479, thermoplastic compositions are provided of polyorganosiloxane and polyphenylene ether having improved drop-weight impact resistance. Lovgren et al, U.S. Pat. Nos. 4,446,090 and 4,487,858, show that high viscosity silicone fluids have been blended with thermoplastic polymers to produce flame retardant thermoplastic materials.

In copending application Ser. No. 07/455,122, filed Dec. 22, 1989, there is described thermoplastic flame retardant silicone-polyphenylene ether graft copolymers resulting from the oxidative coupling of certain phenylsiloxane macromers and 2,6-diorganophenol. It was found that in addition to being a flame retardant high performance thermoplastic, the silicone-polyphenylene ether graft copolymer also produced about a 30% by weight of intumescent residue upon termination of burning. The residue remaining after combustion is sometimes referred to as "char yield". Char yield can be measured by the burning of a $\frac{1}{2}''$ '$\frac{3}{4}''\times 1/16th''$ molded sample of polymer after it has been placed 2 inches from a radiant heat panel having a 4.4 watts/cm$^2$ heat flux. A desirable char is a char which intumesces or swells, since the char can provide an insulating layer between the heat of the flame and the substrate and behave as a mechanical shield to reduce smoke evolution.

SUMMARY OF THE INVENTION

The present invention is based on the discovery that a phenylsiloxane fluid having a critical mole % range of chemically combined diphenylsiloxy units, or methylphenylsiloxy units, or a mixture thereof, as defined below, can reduce the peak smoke release rate (PSRR) and total smoke (STOT) of polyphenylene ethers, if about 2-15 parts by weight of the phenylsiloxane fluid is incorporated into about 100 parts by weight of the polyphenylene ether. Suprisingly, it has been found that if a molded sample of the polyphenylene ether-phenylsiloxane blend is tested under appropriate conditions to measure its char yield as previously defined, the resulting char intumesces or swells forming a mechanical shield which serves as a thermal insulating barrier to reduce smoke evolution.

STATEMENT OF THE INVENTION

There is provided by the present invention, a method of reducing peak smoke release rate and total smoke of a polyphenylene ether, which comprises blending the polyphenylene ether with 2-15 parts by weight of a phenylsiloxane fluid, per 100 parts of polyphenylene ether, where the phenylsiloxane fluid has a molecular weight in the range of from about 800 to 100,000 and consists essentially of chemically combined units of the formula,

| (a) | (C$_6$H$_5$)$_2$SiO |
|-----|---------------------|
| (b) | CH$_3$(C$_6$H$_5$)SiO |
| (c) | (CH$_3$)$_2$SiO | where there is present in the phenylsiloxane fluid from 20 to 40 mole % of (a), or 40 to 80 mole % of (b), or 21 to 79 mole of the sum of (a)+(b), based on the total moles of (a), (b), and (c).

Some of the polyphenylene ethers which can be used in the practice of the present invention have condensed units of the formula,

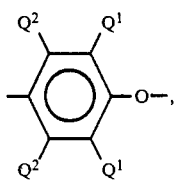

wherein in each of said units independently, each Q$^1$ is independently halogen, primary or secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each Q$^2$ is independently hydrogen, halogen, primary or secondary lower alkyl, phenyl, haloalkyl, hydrocarbonoxy or halohydrocarbonoxy as defined for Q$^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl Preferably, and alkyl radicals are straight chain rather than branched. Most often, each Q$^1$ is alkyl or phenyl, especially C$_{1-4}$ alkyl, and each Q$^2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units.

Also included are the coupled polyphenylene ethers in which the coupling agent is reacted in a known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ethers generally have a number average molecular weight within the range of about 3,000–40,000 and weight average molecular weight within the range of about 20,000–80,000, as determined by gel permeation chromatography. Their intrinsic viscosities are most often in the range of about 0.35–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as o-hydroxyaryl oximes and β-diketones. Also useful are known cobalt-containing catalyst systems.

The phenylsiloxane fluids can have a MW of up to 100,000 and preferably 800 to 5,000. These fluids can be blended with polyphenylene ether to make the flame retardant blends of the present invention. These phenylsiloxanes are well known materials and are shown in the Encyclopedia of Polymer Science and Engineering, Vol. 15, pages 258-264, John Wylie and Sons, New York (1989). For example, the phenylsiloxane fluids of the present invention can be made by initially equilibrating dimethyl silicone stock (hydrolysate or distilled cyclic compounds) and a source of chain terminator, such as a trimethylsiloxy unit. Siloxy units having phenyl substituents can be introduced as diphenylsiloxane or methylphenylsiloxane. In most instances, the equilibrated fluid is devolatilized by heat and vacuum after catalyst deactivation. Phenyl substitution, for example, methylphenylsiloxy units which are equilibrated into the dimethylsiloxane backbone, has been found to increase the thermal and oxidative stability of the resulting polydiorganosiloxane. Copolymers of dimethylsiloxane with some methylphenylsiloxane have been found to have lower pour points because the bulky groups interfere with crystallization of the methyl polymer.

The flame retardant blends of polyphenylene ether and phenylsiloxane fluids can be made by roller mixing or stirring the ingredients and thereafter melt extruding the blend to the moldable state. Compression molding of the ingredients also can be used.

If desired, inert filler materials, such as titanium dioxide, silica, glass fiber, silicon carbide whiskers, carbon fibers, clay, talc, mica and calcium carbonate can be incorporated with the polyphenylene ether and phenylsiloxane fluid during the initial blending process. The fillers can be utilized at from about 1 to 50 parts by weight of filler, per 100 parts of the polyphenylene ether/phenylsiloxane fluid blend.

In order that those skilled in the art will be better able to practice the present invention, the following examples are given by way of illustration and not by way of limitation. All parts are by weight.

EXAMPLE 1

Blends of commercially available phenylsiloxanes and commercially available polyphenylene ether containing 2,6-dimethyl-1,4-phenylene ether units were made by directly adding the phenylsiloxane to predried polyphenylene ether powder in a sealed container. The mixture was roll-mixed for 1-2 hours with the aid of ceramic balls. The phenylsiloxane fluids which were used are shown in the following table, where "φ" is phenyl, "Me" is methyl, D is the average number of condensed diorganosiloxy units, "Term" are the terminal units and "TMS" is trimethylsiloxy,

TABLE 1

| Phenyl-Siloxane Fluid | Fluid Structures (est. mole ratio) | Visc (cs) | $<M_w>$ | $<M_n>$ | D | Term. |
|---|---|---|---|---|---|---|
| 1 | 100 φ2 | 1000-1400 | 1600 | 750 | 2.1 | hydroxy |
| 2$^a$ | 40 φ2:60 Me2 | 400-600 | 1600 | 400 | 4.2 | TMS |
| 3 | 40 φ2:60 Me2 | 350 | 600 | 400 | 1.5 | TMS |
| 4 | 32 φ2:68 Me2 | 32-60 | 1000 | 300 | 3.2 | methoxy |
| 5 | 20 φ2:80 Me2 | 190-200 | 1700 | 1000 | 1.7 | TMS |
| 6 | 20 φ2:80 Me2 | 170-250 | — | — | — | TMS |
| 7 | 15 φ2:85 Me2 | 60 | 650 | 100 | 6 | hydroxy |
| 8 | 5 φ2:95 Me2 | 100 | 8450 | 750 | 11.6 | TMS |
| 9 | 5 φ2:95 Me2 | 100 | 5700 | 1750 | 3.3 | TMS |
| 10 | 100 φMe | 500 | 2600 | — | — | TMS |
| 11 | 90 φMe:10 Me2 | 500 | 2600 | — | — | TMS |
| 12 | 50 φMe:50 Me2 | 125 | 2050 | 1100 | 1.9 | TMS |
| 13 | 50 φMe:50 Me2 | 125 | 2150 | 1300 | 1.6 | TMS |

$^a$equilibrate of 3

The blends of polyphenylene ether and phenylsiloxane were compression molded on a Carver press at 265°-270° C. for 1.5-2 min at 2 tons pressure immediately following roll-mixing. The resulting 2.5"×5"×1/16" plaques had a wide range of transparencies. The plaques were cut into five 0.5"×5"×1/16" bars for UL-94 testing. The bars were aged at room temperature for three days before testing.

The char yield for all samples was measured by placing a ½"×½"×1/16" (approximately 700 mg) specimen under a radiant heat panel (4.4 watts/cm$^2$) and ignited after the sample was preheated for 20-30 seconds. The char volume was estimated by pushing the char through wire gauze shaped as a convex well (60 mm diameter, 30 mm deep) and placed atop a stainless steel beaker (60 mm, 65 mm deep) whereby the char was reduced to a size no larger than 1 mm$^2$. The pre-weighed char was then poured into a volumetric centrifuge tube (10 ml)

and centrifuged for 10 minutes. The volume was measured directly from the centrifuge tube and the volume per unit mass was calculated. The following results were obtained:

TABLE 2

| Phenyl-Siloxane Fluid | Level (phr) | Optical Clarity[a] | UL-94 (1/16") | Char Y (%) | Char V[b] (ml/g) | Char Quality[c] |
|---|---|---|---|---|---|---|
| None | — | clear | 7.6, V-1 | 30.6 | 4.5 | A |
| 1 | 5 | clear | 4.4, V-0 | 33.0 | 4.0 | A |
| 2 | 5 | clear | 2.7, V-0 | 29.0 | 21.1 | B |
| 2 | 8 | clear | 2.1, V-0 | 25.7 | 24.1 | B |
| 2 | 15 | clear | 1.5, V-0 | 25.6 | 17.0 | B |
| 3 | 5 | clear | 5.1, V-1 | 32.2 | ~5 | A |
| 4 | 10 | transl. | — | 28.1 | 21.5 | B |
| 5 | 5 | transl. | 2.8, V-1 | 28.5 | 8.5 | C |
| 6 | 5 | transl. | 1.8, V-0 | 27.2 | 14.8 | C |
| 7 | 5 | opaque | 5.5, V-1 | 27.9 | ~5 | A |
| 8 | 5 | opaque | 6.5, V-1 | 29.2 | 5.8 | A |
| 9 | 5 | opaque | 5.8, V-1 | 30.6 | ~5 | A |
| 10 | 5 | clear | 2.8, V-0 | 28.6 | 10.2 | C |
| 11 | 5 | clear | 3.7, V-0 | 28.9 | 10.5 | C |
| 12 | 5 | transl. | 2.5, V-0 | 28.4 | 19.5 | B |
| 13 | 5 | transl. | 1.6, V-0 | 29.7 | 21.5 | B |

[a]Determined visually: "clear" is transparent and "transl." is translucent.
[b]Char volume is measured by method described above.
[c]A = hard, small, and brittle char; B = voluminous and spongy char; C = moderately voluminous and spongy char.

The above results show that blends of phenylsiloxane and polyphenylene ether possess valuable flame retardant properties. In addition a range of 20 to 40 mole % of diphenylsiloxy units or 40-80 mole % of methyl phenyl siloxy units can provide a satisfactory voluminous and spongy char which can serve as a protective layer for the underlying substrate during burning.

EXAMPLE 2

Blends of some of the phenylsiloxanes of Table 2 and commercially available polyphenylene ether (0.46 IV.) containing 2,6-dimethyl-1,4-phenylene ether units were made by adding the phenylsiloxane to polyphenylene ether powder in a Henschel mixer. The mixture was rapidly stirred and then dried for 4 hours at 80° C. prior to extrusion.

The blends were extruded on a Welding Engineers 20 mm (W/E-20), counter-rotating, non-intermeshing, twin screw extruder. 6"×6"×1/16" OSU plaques were compression molded from extrudate using a Pasadena Hydrolics Inc. molder. Three plaques of each blend were tested in the horizontal configuration under a radiant heat load of 35 kW/m² and continuous measurements of rates of heat and smoke release, including peak rates of heat and smoke release (PRHR, PSRR), and total heat and smoke release (HTOT, STOT) were collected over a 300 sec (5 min) period according to standard OSU protocol (ASTM E906-83) and the results are listed in Table 3. UL-94 (5"×½"×1/16") bars were injection molded from extrudate using a 28 ton Engel injection molding machine and the results are listed in Table 4.

UL-94 results from extruded/injection molded parts parallel those derived from roll mixing/compression molding.

TABLE 3

| Blend | Level (phr) | PRHR | HTOT 2 min | HTOT 5 min | PSRR | STOT 2 min | STOT 5 min |
|---|---|---|---|---|---|---|---|
| None | — | 321 ± 12 | 230 ± 25 | 444 ± 16 | 691 ± 57 | 473 ± 52 | 644 ± 48 |
| 2 | 5 | 136 ± 11 | 81 ± 16 | 346 ± 20 | 336 ± 67 | 160 ± 32 | 371 ± 49 |
| 3 | 5 | 263 ± 26 | 140 ± 15 | 435 ± 10 | 552 ± 41 | 307 ± 20 | 583 ± 23 |
| 4 | 5 | 102 ± 9 | 71 ± 16 | 327 ± 32 | 247 ± 55 | 127 ± 22 | 373 ± 29 |
| 5 | 5 | 141 ± 14 | 86 ± 7 | 355 ± 8 | 363 ± 93 | 171 ± 30 | 436 ± 25 |
| 9 | 5 | 200 ± 8 | 120 ± 50 | 419 ± 27 | 544 ± 56 | 288 ± 121 | 593 ± 37 |
| 10 | 5 | 194 ± 6 | 100 ± 1 | 395 ± 18 | 502 ± 11 | 242 ± 5 | 555 ± 34 |
| 13 | 5 | 117 ± 11 | 59 ± 15 | 252 ± 14 | 292 ± 84 | 90 ± 25 | 205 ± 19 |

TABLE 4

| Additive | Level (phr) | Optical Clarity | Ave. 1st Burn (sec) | Ave. 2nd Burn (sec) | Range (sec) | Ave. FOT (sec) | UL-94 Rating |
|---|---|---|---|---|---|---|---|
| None | — | Clear | 5.42 | 12.62 | 4.4-22.6 | 9.0 | V-1 |
| 2 | 5 | Clear | 1.92 | 1.00 | 0.8-2.6 | 1.5 | V-0 |
| 3 | 5 | Clear | 5.24 | 6.80 | 2.5-14.1 | 6.0 | V-1 |
| 4 | 5 | Clear | 2.26 | 1.76 | 0.9-3.1 | 2.0 | V-0 |
| 5 | 5 | Translucent | 2.48 | 1.58 | 0.9-3.5 | 2.0 | V-0 |
| 9* | 5 | Opaque | — | — | — | — | — |
| 10 | 5 | Clear | 5.12 | 6.38 | 1.6-17.9 | 5.8 | V-1 |
| 13 | 5 | Clear | 1.68 | 1.24 | 0.8-2.5 | 1.5 | V-0 |

*Not injection moldable

The above results show that peak smoke release rate (PSRR) and total smoke (STOT) are clearly dependent on the type of phenylsiloxane used. The intumescing blends have significantly lower PSRR and STOT than non-intumescing materials. For example, 5phr blends, 2, 4, 5, and 13 have 47-64% lower PSRR compared to the PPO control versus only 20-27% decreases for the non-intumescent blends 3, 9, and 10. Additionally, STOT at 5 min for the intumescent blends 2, 4, 5, and 13 are between 32-68% less than the control whereas the non-intumescent blends 3, 9, and 10 have STOT only 8-14% less than the control Although the above example is directed to only a few of the many variables which can be used in the practice of the present invention it should be understood that the present invention is directed to a much broader variety of polyphenylene ether and phenylsiloxane fluids as set forth in the description preceding this example.

We claim:

1. A method for improving the flame retardance and reducing the peak smoke release rate and total smoke of a polyphenylene ether, which comprises blending the polyphenylene ether with 2-15 parts by weight of a phenylsiloxane fluid, per 100 parts of polyphenylene ether where the phenyl siloxane fluid has a molecular weight in the range of about 800-5,000 and consists essentially of dimethylsiloxy units of the formula (CH₃)₂SiO condensed with phenylsiloxy units selected from the class consisting of diphenylsiloxy units of the formula (C₆H₅)₂SiO methylphenylsiloxy units of the formula CH₃(C₆H₅)SiO and a mixture of diphenylsiloxy units and methylphenylsiloxy units, where there is present in the phenylsiloxane fluid from 20 to 40 mole % of diphenylsiloxy units or 40 to 80 mole % of methylphenylsiloxy units or 21 to 70 mole % of the sum of diphenylsiloxy units and methylphenylsiloxy units based on the total moles of condensed dimethylsiloxy units and phenylsiloxy units.

2. A method in accordance with claim 1, where the polyphenylene ether is a poly(2,6-dimethyl-1,4-phenylene ether).

3. A method in accordance with claim 1, where the phenylsiloxane fluid has 20 to 40 mole % of diphenylsiloxy units.

4. A method in accordance with claim 1, where the phenylsiloxane fluid has 40 to 80 mole % of methylphenylsiloxy units.

* * * * *